United States Patent Office 2,967,157
Patented Jan. 3, 1961

2,967,157

ACTIVATION OF CLAY BY ACID TREATMENT AND CALCINATION

Alfred J. Robinson, Philadelphia, Pa., and James V. Weir, Merchantville, N.J., assignors to Minerals & Chemicals Philipp Corporation, a corporation of Maryland No Drawing. Filed Feb. 23, 1955, Ser. No. 490,128

9 Claims. (Cl. 252—450)

This invention relates to the preparation of adsorptive contact masses from naturally occurring kaolin clays, and more particularly the invention relates to the preparation of such contact masses by a "dry" process. The contact masses resulting from our invention are especially suitable for use in the various known hydrocarbon conversion operations, such as fixed bed catalytic cracking processes, thermofor catalytic cracking (TCC) processes, and fluid catalytic cracking processes.

Heretofore, many commercial adsorptive contact masses have been prepared by "wet" acid activation of sub-bentonite clay. These contact masses have been used for example, as adsorbents for decolorizing vegetable and mineral oils and as catalysts in catalytic cracking processes for cracking petroleum hydrocarbons to make gasoline.

In addition to the sub-bentonites, hydrosilicates of aluminum having kaolinite as the chief clay constituent have also been treated in various ways to improve their decolorizing and cracking properties. The treatments have consisted, for the most part of "wet" acid activation procedures similar to those used on sub-bentonites in which clay and acid (usually sulfuric) are allowed to react and the soluble reaction products then leached out with water, leaving behind a material of different chemical composition from that of the original clay and of greater catalytic activity than that possessed by the original clay. It is recognized that kaolin, because of certain inherent characteristics and its ready availability would make a very desirable starting material for catalyst manufacture if it could be economically processed to upgrade its activity, hardness and catalyst life to a sufficient extent. Although, as indicated above, work has been done in efforts to improve the activity, and also the hardness, of kaolin clays, no method has yet been found to produce commercially acceptable cracking catalysts therefrom.

Catalytic activity of an adsorptive contact material usually correlates fairly well with its surface area, i.e., the greater the surface area, the greater the activity. This tie-in of activity with surface area might explain why the above-mentioned solubilization and leaching out of part of the clay structure results in greater activity for the remaining part. Hardness is perhaps as important a property of catalysts as activity. Hardness is important in that it helps to reduce attrition of catalyst particles during their utilization in cracking operations. Attrition is detrimental for two principal reasons: it results in loss of catalyst as fines entrained in the effluent vapor stream and it brings about reduction in size of catalyst particles which deleteriously affects the flow rate of hydrocarbon vapors therethrough.

In the fixed bed process for catalytic cracking the vapors are passed through a bed of catalyst particles which are thereby subjected to attrition by the gas stream. Reduction of catalyst particles in size, through attrition, results in a change in void space within the bed which in turn affects the vapor flow rate through the reactor so that it tends to deviate from the established optimum. Thus hardness is obviously essential in fixed bed catalyst to help combat attrition.

The TCC process employs a moving bed of catalyst particles ranging in size from about 10-mesh to about 4-mesh, usually in the form of pellets or beads. The direction of catalyst movement is downwards towards the base of the reactor from whence it is lifted by elevators to a regenerator and then, after regeneration, back to the top of the reaction zone for another pass therethrough. The hydrocarbon vapors pass through the reaction zone either concurrently or countercurrently to the direction of catalyst movement. The opportunities for catalyst attrition in this operation are many and hardness of particles is of great importance.

The solid catalyst in the fluid catalytic cracking process is of small enough particle size to permit its suspension in the stream of hydrocarbon vapors being contacted so that the resulting solid-gas system takes on the appearance of a fluid. Experience has shown that fluid catalysts should consist of particles preferably within the size range of about 20 to about 150 microns in equivalent diameter but, in any case, with not more than 20 percent of its weight made up of particles finer than 40 microns. Fine catalyst solids carried out in the effluent vapors can be separated therefrom in cyclone separators and electrostatic precipitators but these devices do not effectively remove particles smaller than about 10 microns in equivalent diameter and thus such fines resulting from attrition would be lost from the system. Sufficient hardness to reduce attrition to a minimum and consequently keep catalyst losses relatively low is very desirable in fluid catalysts.

It is the primary object of the present invention to provide a practical "dry" method for converting kaolin clay to commercially useful adsorptive contact materials particularly suited for use as catalysts in the cracking of petroleum hydrocarbons to gasoline.

Other objects and advantages of the invention will be apparent from the description which follows:

As previously noted, the process of the present invention is intended for use on kaolin clays, by which is meant those naturally occurring clays containing kaolinite as the chief mineral constituent. The chemical composition of kaolinite is represented by the formula, $Al_2O_3.2SiO_2.xH_2O$, where $x$ is usually 2. The weight ratio of $SiO_2$ to $Al_2O_3$ indicated by this formula is 1.18 and kaolin clays normally possess $SiO_2/Al_2O_3$ ratios of from 1.0 to 1.5.

Briefly, the process of our invention comprises reacting kaolin clay with sulfuric acid and then, without leaching out soluble reaction products, calcining the mixture to drive off volatiles. The calcined product is a commercially useful adsorptive contact material, much superior to the original clay in catalytic activity and hardness.

Although not intending to be bound by any theory in connection with the mechanisms involved in our invention, the following postulation seems to offer a logical explanation of the changes produced in kaolin clay by our treatment. According to this concept, sulfuric acid reacts with aluminum and oxygen atoms in the clay to form aluminum sulfate, its hydrates and water, thus, in effect, removing aluminum oxide from the kaolinite structure; upon calcination of the resulting mixture the aluminum sulfate and its hydrates decompose to aluminum oxide and oxides of sulfur, the latter passing off as vapor. The final product, from our "dry" process, assuming the above postulation to be true, is a material of the same volatile free chemical composition as the starting clay but of different crystal structure since aluminum and oxygen atoms have been displaced from the lattice by the acid reaction and then redeposited, in different positions, during the calcination. The rearrangement of aluminum oxide is such that the final material has greater surface area (hence greater activity) and greater hardness than the original clay; for example, the aluminum oxide might be redeposited in the form of strengthening pillars between adjacent lamellae of the undissolved kaolinite. X-ray data on kaolin clays before, during and after treatment by the process of the present invention lends support to the theory expressed above.

While the process of our invention is a dry one in the sense that it entails no leaching of acid-treated kaolin clay for removal of solubilized portions, this does not preclude the possibility of adding water to the system for purposes other than leaching. For example, water could be used to make the clay-acid mixture more readily extrudable or to dilute the mixture to a proper consistency for handling in a spray dryer, spray drying being a useful means for forming clay into particles of the proper size and shape for use in fluid catalyst operations.

The reaction of kaolin clay and sulfuric acid, which is the first phase of our process, can be accomplished by mixing the acid and clay to an appearance of homogeneity in any conventional mixer suitable for this purpose, as for example a pug mill, and then maintaining the reactants in intimate contact under conditions of time and temperature such that a substantial portion of the acid reacts. It is preferable when maintaining the reactants in intimate contact to keep them protected from the atmosphere to minimize change in moisture content, such changes having deleterious effects on the hardness of the final product. Hereinafter the period allowed for further reaction, after mixing, will be referred to as aging.

We prefer degritted raw clay (that which has been refined to the extent that grit, foreign bodies and clots of undispersed clay have been eliminated but which has been given no other preliminary treatment) as a starting material in our process but wish to have it clearly understood that the invention is not limited to the treatment of such a product. Clays which have received other preliminary treatments not entailing appreciable removal of aluminum may still be amenable to processing in accordance with our invention. Examples of preliminary treatments falling within this category are deironing by physical or chemical methods, conventional classifying operations and even partial acid activation by the previously mentioned wet procedures. We have found that calcination of kaolin clay prior to treatment with the acid, however, renders it less suitable for our process. For example, if the clay is calcined at temperatures in excess of 1500° F., the final pelleted catalyst does not have good attrition properties. Likewise, the V.M. of the starting clay should not be so high as to make for too dilute a mixture of acid and clay for optimum handling and aging conditions. We have found that excellent results are obtainable using a starting clay of about 14 percent V.M. content.

For the sulfuric acid, we prefer to use a concentrated acid, such as the commercially available 66° Bé. (about 93 percent $H_2SO_4$) grade and then add water to the mix if necessary to improve its workability. However, any strength acid consistent with proper plasticity of mix for the dosage employed can be used within the teachings of our invention. We prefer to use dosages from about 60 percent to about 125 percent. Acid dosage is defined as the weight of 100 percent acid per weight of volatile free clay expressed on a percentage basis, volatile free clay being that which has been heated to essentially constant weight at 1700° F. Below 60 percent dosage the clay conversion gradually falls off to ineffectual levels for petroleum cracking purposes, and normally 130 percent dosage is adequate for substantially complete reaction with the alumina in the clay. We have experimentally discovered that optimum temperatures of aging the clay-acid mixtures of our invention fall within the limits of from about 220° to 325° F. and optimum times within the range from 6 to 300 hours.

The calcining step of our process should be carried out preferably at from 1500° F. to 1600° F. and for a long enough period to drive off substantially all materials which are volatile within this temperature range, six to eight hours being sufficient in many cases with an overall range of from about three to about 24 hours representing a suitable working range. It is particularly important that substantially all sulfates be decomposed with accompanying loss of oxides of sulfur during the calcination if the final product is to be used as a cracking catalyst since sulfates are very undesirable therein. When calcination temperatures much below 1500° F. are used, decomposition is incomplete and when they exceed 1600° F., final surface area is lowered. However, we do not intend the exclusion of all calcination temperatures outside of the 1500° to 1600° F. range from our process since some utility would accrue from calcination at temperatures somewhat lower than 1500° F. as, for example, around 1450° F. and at temperatures higher than 1600° F. (say up to 1800° F.), especially where the final contact materials are intended for uses other than as catalysts.

The contact masses of our invention may be in the form of granules particularly suitable for use in fixed bed cracking processes and TCC processes or fines especially suited for fluid catalyst cracking processes. Formation of these masses can be accomplished at various stages of our process prior to the calcination step by any of the methods well known to those skilled in the art. For example, the clay-acid mixture can be extruded to form pellets just after the mixing operation and prior to aging or after aging and just prior to calcination. In the case of fluid catalyst formation, the clay can be reacted with acid and the product slipped and spray-dried prior to calcination. An inert combustible filler such as, for example, wood flour, corn meal, sawdust, carbon or the like, may be worked into the clay-acid mass some time prior to its calcination, e.g., at the time of the acid addition just before the aging or after aging if extrusion has not preceded this step. This filler among other things serves to increase the porosity of the final contact masses since it would burn out in the calcination step leaving voids behind. Water can, if necessary, be added to the clay mass to improve its mixing and/or extruding characteristics without departure from the spirit of our invention.

While the various modifications of our process noted above represent the preferred embodiments thereof, it is to be understood that other modifications falling within the scope of our invention are entirely possible.

Following are examples included for purposes of illustration only and not to be construed as limiting the invention to any particular embodiments disclosed therein.

EXAMPLE I

This example shows the improvements in surface area, hardness and activity brought about in a sample of kaolin clay by the treatment of the present invention. The kaolin clay of this example was a clay from Georgia which had been refined to eliminate sand, mica and water soluble salts and which contained about 14 percent V.M. Its analysis by weight, on a total weight basis was as follows:

| | Percent |
|---|---|
| $SiO_2$ | 44.20 |
| $Al_2O_3$ | 40.14 |
| $Fe_2O_3$ | Trace |
| $CaO$ | 0.02 |
| $MgO$ | 0.02 |
| $TiO_2$ | 0.40 |
| Alkali metal oxides | 0.5 |

An 89 percent dosage of concentrated sulfuric acid (about 93 percent $H_2SO_4$) was added to a sample of the above clay containing 5 percent, based on the weight of volatile free clay, activated carbon. The clay and acid were mixed to an appearance of homogeneity by pugging and the mixture then extruded to form pellets $3/16$ in. in diameter and about $3/16$ in. long. The pellets were aged for about 35 hours at from 225° F. to 240° F. and then calcined at 1500° F. until sulfate free. Surface area, hardness and CAT-A evaluations were run on the calcined pellets.

The surface area was determined by the method described in the article by Brunauer, Emmett and Teller appearing in J. Am. Chem. Soc. 60, 309–319 (1938), using a cross-sectional area of 15.4 A.$^2$ for the nitrogen molecule as suggested by H. K. Livingston in J. Colloid Sci., 4, 447–458 (1949).

Pellet hardness was evaluated by a modification of the so-called Union Hardness Test. For this evaluation, a sample of pellets was screened through a 3-mesh screen first and then a 5-mesh one, the $3/5$ fraction being used for the test and the oversize and undersize particles being discarded. Twenty-five grams of the $3/5$ pellets were placed in a steel cylinder along with eight steel balls of $5/8$-inch diameter. The cylinder containing the pellets and steel balls was rotated end-over-end for ten minutes at 18 r.p.m. and the contents then discharged onto an 8-mesh screen. The pellet fragments were separated into plus-8-mesh and minus-8-mesh fractions and the hardness calculated as indicated below:

$$\frac{\text{Wt. of plus-8-mesh}}{\text{Total wt. of both fractions}} \times 100 = \text{Percent hardness}$$

In making the CAT-A evaluations for catalytic activity, a method described by J. Alexander and H. G. Shimp in an article on page R537 of National Petroleum News, Technical Section, August 2, 1944, was used. In this method, a standard light East Texas gas oil is contacted at a rate of 5 cc. per minute for ten minutes with 200 cc. of catalyst pellets at 800° F. The liquid product from the cracking test is collected at a temperature of 60° F. Catalytic activity is measured as the volume percent yield of gasoline on a no-loss basis (N.L.B. gasoline yield) and given as the volume of 410° F. endpoint gasoline distilled from the aforesaid cracked product, corrected for 100 percent recovery, expressed as a percentage of the volume of gas oil charged. As part of the evaluation the weight of coke deposited on the catalyst, weight of gas produced and gas specific gravity are determined. The coke and gas weights are expressed as percentages of gas oil charged. Two CAT-A cycles are run but only data from the second cycle are used since experience has shown these data to be sound. In general the ratio of N.L.B. gasoline yield to coke yield should exceed about 9/1 or 10/1; gas gravity should be at least 1.2 or higher.

Test results on the catalyst of this example are below:

*Table 1*

| | |
|---|---|
| Surface area ___square meters per gram (m.$^2$/g.)__ | 93 |
| Hardness _____percent__ | 78 |
| CAT-A: | |
|   N.L.B. gasoline yield _____do____ | 29.3 |
|   Coke _____do____ | 2.4 |
|   Gas _____do____ | 5.8 |
|   Gas gravity _____ | 1.26 |

Following are results of testing raw kaolin clay for comparison with the above data.

*Table 2*

| | |
|---|---|
| Surface area _____m.$^2$/g__ | 20 |
| Hardness _____percent__ | 30 |
| CAT-A: | |
|   N.L.B. gasoline yield _____do____ | 10.9 |
|   Coke _____do____ | 3.6 |
|   Gas _____do____ | 3.3 |
|   Gas gravity _____ | 0.43 |

Comparison of Tables 2 and 1 clearly shows the great improvement wrought in raw kaolin, in all criteria of contact efficacy tested, by the process of our invention. It should be particularly noted that the N.L.B. gasoline/coke ratio and gas gravity of raw kaolin have been increased to levels of commercial acceptability by our process.

In addition to the above tests, a so-called 6.8 liter evaluation was run on the catalyst of this example. This evaluation is carried out in a fixed bed cracking unit with a catalyst capacity of 6.8 liters. Two cracking operations are carried out in the unit, one using the catalyst to be tested and the other a commercial sub-bentonite catalyst (Filtrol 62) as a standard. The space rate necessary to achieve 55 percent volume conversion of the gas oil feed is determined for each of the catalysts and the ratio of space rates (with that of Filtrol 62 as the denominator), expressed as a percentage, used as a measure of the efficiency of the sample catalyst. The efficiency of the present catalyst by this method was 132 percent, showing it to be considerably superior to the standard commercial catalyst in conversion efficiency. By way of comparison, the efficiency of pellets made from degritted but otherwise untreated kaolin, of the type used to make the pellets of this example, was found to be only 32 percent by the 6.8 liter method. The untreated kaolin pellets were formed from a plastic mix of clay and water and dried at a temperature between 250° and 300° F.

EXAMPLE II

This example shows that our catalyst is very resistant to a steam treatment comprising the subjection of the catalyst to the action of 100 percent steam for four hours at 1350° F. The effect of this test is commonly used as a criterion of the ability of the tested catalyst to withstand repeated regeneration without loss of activity.

Pellets were made from a mixture of kaolin clay, sulfuric acid, wood flour and water (for extrudability) by extrusion as in Example I. The proportions of ingredients were: 100 parts of volatile free kaolin, 60 parts of 96 percent sulfuric acid, 5 parts of wood flour and 55 parts of water. The pellets were of $3/16$ in. diameter and about $3/16$ in. long. The composition of the kaolin used was:

| | Percent |
|---|---|
| $SiO_2$ _____ | 45.42 |
| $Al_2O_3$ _____ | 38.79 |
| $CaO$ _____ | 0.35 |
| $Fe_2O_3$ _____ | 0.31 |
| $TiO_2$ _____ | 1.59 |
| Alkali metal oxides _____ | 0.15 |

The above percentages are expressed on a total weight basis. V.M. of the clay was about 14 percent.

The extruded pellets were aged at 220° F. for 24 hours and then calcined in a muffle furnace for eight hours at 1500° F. The finished pellets gave negative results when tested for residual sulfate. The test for sulfate consisted of grinding the pellets in a mortar and pestle, adding a known weight of the resulting powder to distilled water and boiling the mixture for ten minutes, cooling the suspension to room temperature and titrating it with 0.1 normal NaOH solution using phenolphthalein as an indicator.

CAT-A results on the pellets before and after steam treatment as described above (steam stability test) are given in the following table.

*Table 3*

| CAT-A | Before Steam | After Steam |
|---|---|---|
| N.L.B. gasoline yield_____percent__ | 27 | 27 |
| Coke yield_____do____ | 2.5 | 2.4 |
| Gas yield_____do____ | 5.6 | 3.6 |
| Gas gravity_____ | 1.27 | 1.30 |

The above results show that good activity was achieved in the pellets and that they were possessed of exceptional steam stability.

EXAMPLE III

This example illustrates the practicing of our process using a calcination temperature of 1550° F.

A sample of the same kaolin clay as that in Example II was mixed with a 65 percent dosage added as 96 percent sulfuric acid and the resultant mass formed into 3/16 inch by 3/16 inch pellets by extrusion as in the previous examples. The pellets were aged at 220° F. for 24 hours and then calcined at 1550° F. for six hours. The finished pellets were found to contain 0.05 percent sulfate, to possess a surface area of 91 m.$^2$/gm. and to have a hardness of 84 percent. Thus, calcination at 1550° F. produced a low sulfate contact material with a surface area approximately equal to, and a hardness superior to, that of the Example I catalyst.

EXAMPLE IV

This is an example of the use of our invention in the making of fluid catalyst microspheres.

Uncalcined kaolin clay was ground to pass a 10-mesh screen and, after being dried for three hours at 230° F., reground to pass through a 100-mesh screen. The minus-100-mesh clay was mixed with 84 percent sulfuric acid at 105 percent dosage and the mixture then aged 24 hours at 230° F. The aged material was made into a 25 percent solids slip (on an original volatile free clay weight basis) with water and the slip was dried to form microspheres (small spherical-shaped masses of proper size distribution to be used as fluid catalysts). The microspheres were calcined at 1500° F. for six hours.

The surface area of the microspheres was measured and found to be 114 m.$^2$/gram. In addition, a sample of the microspheres was tested in a Roller Particle Size Analyzer, a standard piece of equipment manufactured by American Instrument Company which can be used for the determination of attrition losses as an indication of hardness. In this test the microspheres exhibited a weight loss of only 5.2 percent after 20 hours of running time, a result indicative of excellent hardness. Raw kaolin was discovered to be too soft for testing in a Roller Analyzer and the surface area of a sample thereof turned out to be 11 m.$^2$/gram. Thus, the present example shows that our process produces a fluid catalyst from kaolin having excellent hardness and an activity greatly superior to that of the original clay.

We claim:

1. A method for the preparation of adsorptive contact masses from kaolin clay comprising reacting kaolin clay with sulfuric acid in an amount of from 60% to 125% based on the volatile free weight of said kaolin clay, and then, without washing out water soluble reaction products, calcining the reacted mixture at a temperature and for a time sufficient to substantially eliminate sulfate therefrom.

2. An adsorptive contact mass produced in accordance with the method of claim 1.

3. A method for the preparation of adsorptive contact masses from kaolin clay comprising mixing kaolin clay with sulfuric acid in an amount of from 60% to 125% based on the volatile free weight of said kaolin clay, forming said mixture into shaped masses, reacting said kaolin clay with said sulfuric acid, and then, without washing out water soluble reaction products, calcining the shaped masses at a temperature and for a time sufficient to substantially eliminate sulfate therefrom.

4. A method for the preparation of adsorptive contact masses from kaolin clay comprising mixing kaolin clay with sulfuric acid in an amount of from 60% to 125% based on the volatile free weight of said kaolin clay, forming said mixture into shaped masses, reacting said kaolin clay with said sulfuric acid, and then, without washing out water soluble reaction products, calcining the shaped masses at a temperature of from about 1450° F. to about 1800° F. for a time sufficient to substantially eliminate sulfate therefrom.

5. An adsorptive contact mass produced in accordance with the method of claim 4.

6. A method for the preparation of adsorptive contact masses from kaolin clay comprising mixing kaolin clay with sulfuric acid in an amount of from 60% to 125% based on the volatile free weight of said kaolin clay, said sulfuric acid being in aqueous solution having a concentration of from 90% to 100%, extruding the mixture into pellets, reacting said kaolin clay with said sulfuric acid, and then, without washing out water soluble reaction products, calcining the pellets at a temperature and for a time sufficient to substantially eliminate sulfate therefrom.

7. A method for the preparation of adsorptive contact masses from kaolin clay comprising mixing kaolin clay with sulfuric acid in an amount of from 60% to 125% based on the volatile free weight of said kaolin clay, extruding the mixture into pellets, maintaining the pellets at a temperature from about 220° F. to about 325° F. for a time sufficient to effect substantial reaction between said kaolin clay and said sulfuric acid, and then, without washing out water soluble reaction products, calcining the pellets at a temperature and for a time sufficient to substantially eliminate sulfate therefrom.

8. A method for the preparation of adsorptive contact masses from kaolin clay comprising mixing kaolin clay with sulfuric acid in an amount of from 60% to 125% based on the volatile free weight of said kaolin clay, extruding the mixture into pellets, maintaining the pellets at a temperature from about 220° F. to about 325° F. for a time sufficient to effect substantial reaction between said kaolin clay and said sulfuric acid, and then, without washing out water soluble reaction products, calcining the pellets at a temperature of from about 1450° F. to about 1800° F. for a time sufficient to substantially eliminate sulfate therefrom.

9. An adsorptive contact mass produced in accordance with the method of claim 8.

References Cited in the file of this patent

UNITED STATES PATENTS

| Number | Name | Date |
|---|---|---|
| 1,634,514 | Rial et al. | July 5, 1927 |
| 1,739,796 | Mahler | Dec. 17, 1929 |
| 1,792,625 | Baylis | Feb. 17, 1931 |
| 1,827,165 | Pfaff et al. | Oct. 13, 1931 |
| 2,171,408 | Smit | Aug. 29, 1939 |
| 2,192,000 | Wilson | Feb. 27, 1940 |
| 2,477,639 | Mills | Aug. 2, 1949 |
| 2,485,626 | Mills | Oct. 25, 1949 |
| 2,671,058 | Mickelson | Mar. 2, 1954 |
| 2,686,161 | Stewart | Aug. 10, 1954 |

FOREIGN PATENTS

| Number | Country | Date |
|---|---|---|
| 239,169 | Great Britain | July 6, 1926 |